(12) United States Patent
Havang et al.

(10) Patent No.: US 12,659,244 B2
(45) Date of Patent: Jun. 16, 2026

(54) SYSTEM AND METHOD FOR DETERMINING MEAN OPINION SCORE FOR APPLICATION QUALITY OF EXPERIENCE

(71) Applicant: Sandvine Corporation, Waterloo (CA)

(72) Inventors: Alexander Havang, Malmo (SE); Swaminathan Srinivasan, Malmo (SE); Vishal Kulshrestha, Bengaluru (IN); Marcus David Bjork, Veddige (SE)

(*) Notice: Subject to any disclaimer, the term of this patent is extended or adjusted under 35 U.S.C. 154(b) by 28 days.

(21) Appl. No.: 18/585,793

(22) Filed: Feb. 23, 2024

(65) Prior Publication Data

US 2024/0291736 A1 Aug. 29, 2024

(30) Foreign Application Priority Data

Feb. 24, 2023 (IN) .............................. 202311012644

(51) Int. Cl.
*H04L 41/5067* (2022.01)

(52) U.S. Cl.
CPC ................................ *H04L 41/5067* (2013.01)

(58) Field of Classification Search
None
See application file for complete search history.

(56) References Cited

U.S. PATENT DOCUMENTS

| | | | |
|---|---|---|---|
| 8,280,994 B2* | 10/2012 | Blouin | H04L 43/0817 709/224 |
| 8,441,955 B2* | 5/2013 | Wilkinson | H04N 21/234309 370/252 |
| 2008/0155087 A1* | 6/2008 | Blouin | H04L 41/5006 709/223 |
| 2012/0188882 A1* | 7/2012 | Wilkinson | H04N 21/6473 370/252 |
| 2013/0219048 A1* | 8/2013 | Arvidsson | H04L 43/16 709/224 |
| 2013/0223207 A1* | 8/2013 | Bouchard | H04L 47/26 370/229 |
| 2013/0301415 A1* | 11/2013 | Archer | H04L 41/0894 370/235 |
| 2013/0311667 A1* | 11/2013 | Payette | H04L 67/1025 709/228 |

(Continued)

*Primary Examiner* — Ranodhi Serrao
(74) *Attorney, Agent, or Firm* — Amarok IP Inc.; Neil W. Henderson

(57) ABSTRACT

A system and method for determining application quality of experience. The system including: a logic module configured to collect input data associated with network traffic flow parameters and extract a feature set based on the network flow parameters; a model module configured to train a machine learning model to determine MOS based on the extracted feature set; and a traffic action module configured to monitor the MOS based on the machine learning model and the traffic flow in the network and determining application quality of experience based on the MOS. The method including: collecting input data associated with network flow parameters; extracting a feature set based on the collected data; training a model to determine MOS of network traffic based on the extract feature set; deploying the model to monitor the MOS of traffic flow in the computer network; and determining the quality of experience based on the MOS.

16 Claims, 9 Drawing Sheets

(56)  References Cited

U.S. PATENT DOCUMENTS

| | | | | |
|---|---|---|---|---|
| 2014/0043973 | A1* | 2/2014 | Groenendijk | H04L 41/5025 |
| | | | | 370/230 |
| 2017/0019291 | A1* | 1/2017 | Tapia | H04L 41/16 |
| 2017/0019315 | A1* | 1/2017 | Tapia | H04L 41/0631 |
| 2017/0302554 | A1* | 10/2017 | Chandrasekaran | |
| | | | | H04L 43/0811 |
| 2018/0367370 | A1* | 12/2018 | Tapia | H04L 41/0631 |
| 2019/0037002 | A1* | 1/2019 | Arunachalam | H04M 7/1285 |
| 2019/0199772 | A1* | 6/2019 | Pennarun | H04L 43/50 |
| 2020/0120003 | A1* | 4/2020 | Sridhar | G06Q 30/02 |
| 2021/0234773 | A1* | 7/2021 | Maggiore | H04L 41/5009 |
| 2021/0314238 | A1* | 10/2021 | Cioffi | H04L 41/5067 |

* cited by examiner

SYSTEM AND METHOD FOR DETERMINING MEAN OPINION SCORE FOR APPLICATION QUALITY OF EXPERIENCE

RELATED APPLICATION

The present application claims priority to Indian Provisional Patent Application No. 202311012644 filed Feb. 24, 2023, which is hereby incorporated herein in its entirety.

FIELD

The present disclosure relates generally to computer network traffic. More particularly, the present disclosure relates to a system and method for determining a mean opinion score (MOS) for application Quality of Experience (QoE).

BACKGROUND

Service Providers, including Internet Service Providers (ISP) as well as content providers, generally try to provide the best Quality of Service (QOS) to the largest number of users given network constraints. As more people access content via online networks and as users increase the amount of data used, congestion continues to grow. As such, various congestion control strategies have been used to attempt to improve the Quality of Service (QOS) and the Quality of Experience (QoE) for users on the network.

Users may experience various levels of QoE which may differ based on application and the content delivered by the application. Operators of computer networks try to provide high levels of QoE across various applications, but as applications may be able to provide a variety of different types of traffic flows, some traffic flows may be more affected by latency, loss, or other issues. Mean opinion score (MOS) is a frequently used measure for video, audio, and audiovisual quality evaluation in computer networks. MOS is generally expressed in the range of 1 to 5 with 1 being the lowest perceived quality. MOS is generally used in determining and quantifying user's Quality of Experience.

As such, there is a need for an improved method and system for determining MOS for Application Quality of Experience.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a system for determining application quality of experience including: a logic module configured to collect input data associated with network traffic flow parameters and extract a feature set based on the network flow parameters; a model module configured to train a machine learning model to determine a mean opinion score (MOS) based on the extracted feature set; and a traffic action module configured to monitor the MOS based on the machine learning model and the traffic flow in the network and determining application quality of experience based on the MOS.

In some cases, the logic module may be configured to aggregate the input data over a predetermined period of time.

In some cases, the input data may be aggregated over shorter periods of time records and the aggregated shorter period of time records are further aggregated over longer periods of time.

In some cases, the logic module may be configured to aggregate the input data over a plurality of traffic flow parameters.

In some cases, the logic module may be configured to aggregate the input data based on a weighting provided for each parameter.

In some cases, the logic module may be configured to receive end user input as a network flow.

In some cases, the logic module may be configured to determine a duration of use of an application and a weight the record based on the duration of use by an end user.

In some cases, the system may include at least two logic modules configured to generate asymmetric traffic for the input data.

In some cases, the parameters may include at least one of the group comprising: time, subscriber, application, application category, application content category, location, device, and service plan.

In another aspect there is provided a method for determining application quality of experience including: collecting input data associated with network flow parameters; extracting a feature set based on the collected data; training a model to determine mean option score (MOS) of network traffic based on the extract feature set; deploying the model to monitor the MOS of traffic flow in the computer network; and determining the quality of experience based on the MOS.

In some cases, the method may include aggregating the input data over a predetermined period of time.

In some cases, the method may include aggregating over shorter periods of time records and the aggregated shorter period of time records are further aggregated over longer periods of time.

In some cases, the method may include aggregating the input data over a plurality of traffic flow parameters.

In some cases, the method may include aggregating the input data based on a weighting provided for each parameter.

In some cases, the method may include receiving end user input as a network traffic flow parameter.

In some cases, the method may include determining a duration of use of an application and a weight the record based on the duration of use by an end user.

In some cases, the parameters comprise at least one of the group comprising: time, subscriber, application, application category, application content category, location, device, and service plan.

In some cases, the method may include generating asymmetric traffic to be collected as input data.

Other aspects and features of the present disclosure will become apparent to those ordinarily skilled in the art upon review of the following description of specific embodiments in conjunction with the accompanying figures.

BRIEF DESCRIPTION OF FIGURES

Embodiments of the present disclosure will now be described, by way of example only, with reference to the attached Figures.

FIG. 3 a chart illustrating various applications associated with an application category;

FIG. 4 is a chart illustrating various content categories per application category;

DETAILED DESCRIPTION

In the following, various example systems and methods will be described to provide example embodiment(s). It will be understood that no embodiment described below is intended to limit any claimed invention. The claims are not limited to systems, apparatuses or methods having all of the features of any one embodiment or to features common to multiple or all of the embodiments described herein. A claim may include features taken from any embodiment as would be understood by one of skill in the art. The applicants, inventors or owners reserve all rights that they may have in any invention disclosed herein, for example the right to claim such an invention in a continuing or divisional application and do not intend to abandon, disclaim or dedicate to the public any such invention by its disclosure in this document.

Generally, the present disclosure provides a method and system determining application quality of experience. The system is configured to include a logic module sometimes referred to as an active logic module configured to collect data associated with network traffic flow parameters and dimensions and extract a feature set to be used in determining end user Quality of Experience (QoE). The parameters or extracted feature set are intended to be aggregated with weights assigned to each parameter based on how each parameter affects end user QoE. The system is further configured to include a model module configured to train a machine learning model to determine a mean opinion score (MOS) based on the aggregated and weighted parameters. In some cases, the system may further include a traffic action module configured to monitor the MOS based on the machine learning model and the traffic flow in the network and determining application quality of experience based on the MOS.

In determining Quality of Experience (QoE) of an application, there may be various factors that need to be considered. In some cases, the QoE of an application may depend on, for example, throughput, latency, pattern of data transfer, reactivity of network to sudden burst demand, and the like. However, when one application carries various types of content, the overall experience of a user could depend on these types of contents. The user's experience may vary based on what user activity was performed on the application. The QoE cannot be validated directly on network parameters without taking into account the type of content it is carrying. This can only be done if the type of content is known or can be recognized. Embodiments of the system and method detailed herein are configured to determine the Application's QoE by taking its content categories into consideration.

Figure 1:
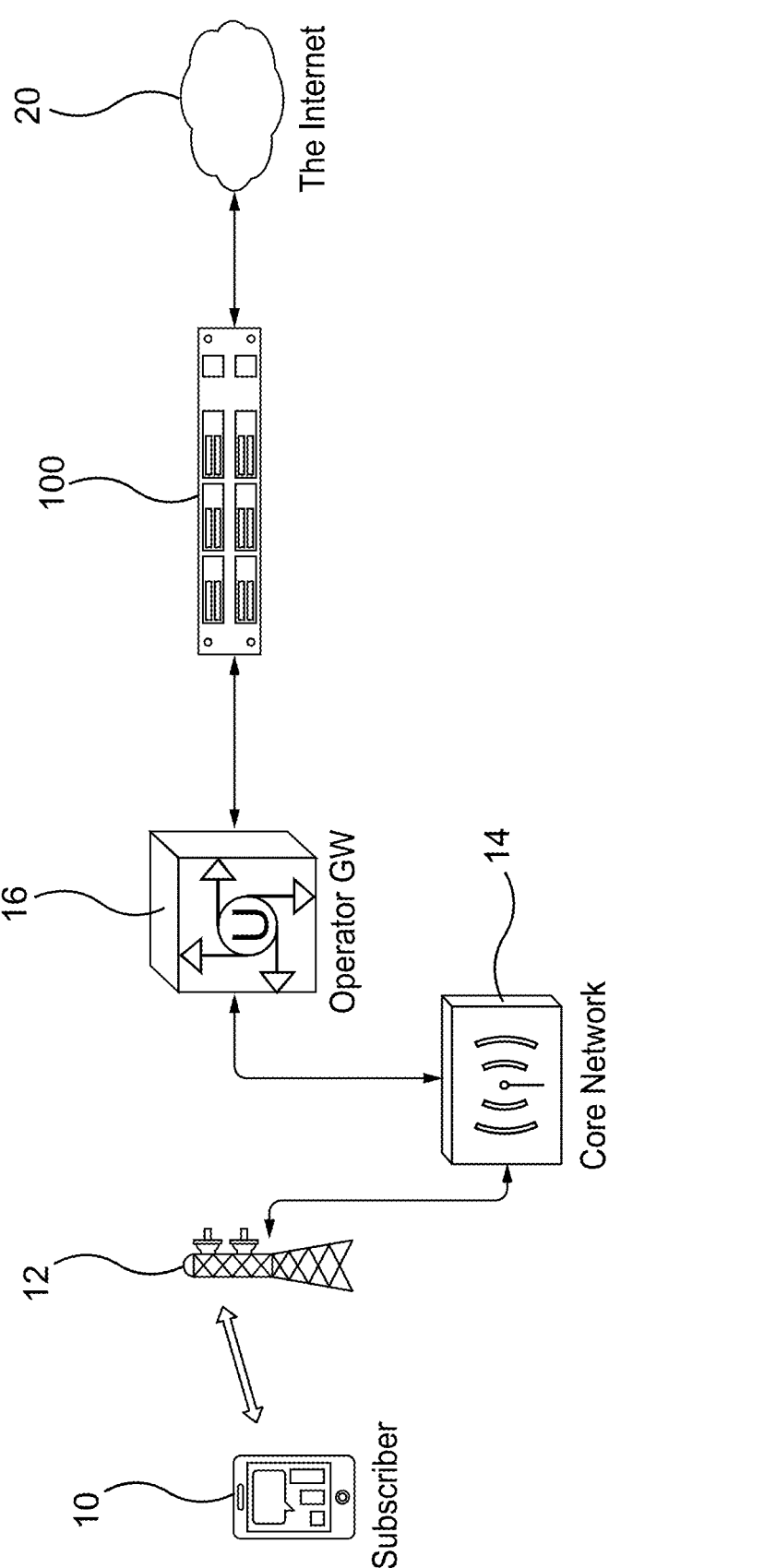
FIG. 1 illustrates a diagram of a computer network architecture including an embodiment of a system for determining application QoE based on application and content categories.

FIG. 1 illustrates an environment for an embodiment of the system. A subscriber, using a user device 10, may initiate a traffic flow with a base station 12. The traffic flow may be transmitted to and from a core network 14 from the base station. The traffic flow may be seen and directed by the operator network 16 and may be reviewed and classified by a system 100 for determining application and content. The system 100 may be included as a component of a network device which resides between the operator's gateway and the Internet 20. The system 100 is intended to reside within the operator's or Internet Service Provider's (ISP's) network 16. It will be understood that embodiments of the system and method detailed herein are intended to be employed over any type of computer network, for example, fixed line, mobile, satellite or other computer network.

The system 100 is configured to be transparent to users. It will be understood that FIG. 1 illustrates a high-level network architecture and that a computer network may include further aspects not illustrated.

The system 100 for determining MOS is intended to reside in the core network. In particular, the system 100 is intended to be in a location where the system is able to access the data noted herein. It will be understood that in some cases the system may be a physical network device or may be a virtual network device. The system may also be distributed over a number of physical or virtual devices. It will be understood that the system may be used on any IP based networking system, for example, Wi-Fi based, mobile data networks like GPRS, CDMA, 4G, 5G, LTE, satellite based, WLAN based networks, fixed line broadband fiber optic networks as well as on virtual private networks.

Generally, the QoE of an application can be determined at two places. The first bring the Application Server which can be configured to measure the QoE. For example, Netflix can put logic on both the client and server side to determine how the Netflix application is performing. The second place to determine the QoE of an application is an application recognition engine that is placed in the path of the data and measures QoE.

There are two types of QoE that are useful, Application's Network QoE, which is the QoE of the network as relevant to a given application and End User Application QoE, which is the QoE that end user perceives for an application.

Embodiments of the system and method detailed herein are intended to aid in determining End user Application QoE MOS (Mean Opinion Score). MOS is generally a value from 1 to 5 usually where 1 means worst QoE and 5 means excellent QoE, although other scales may be used. MOS is generally a commonly used scale of measurement used in the industry.

End User Application QoE, which is generally considered to be how using an application feels like to a subscriber, is subjective. When using a Mean Opinion Score (MOS) model, embodiments of the system and method are intended to identify a few variables, for example, Throughput, Latency, Loss, Jitter, and the like, as well as time-series variants of these variables and use them to determine features that help predict the MOS score. The time periods in these time-series data and which variables are chosen for an MOS grading model may be determined by machine learning models. It is intended to leverage machine learning to determine feature and parameter selection. Further, it has been found to be difficult to determine this type of data and keep it up to date given new test data coming in and applications changing their nature on a daily or regular basis.

Embodiments of the system and method are intended to provide for a solution for multi-variable and multi-dimensional fitting problem lends using a machine learning reinforcement learning mechanism. Embodiments of the system and method are intended to collect data and users/testers perceived MOS for an application in a test environment using various network conditions and impediments. Using the above data with a reinforcement learning or supervised learning method, the system is configured to train a model for determining MOS. The model is then deployed by the system in a network device and configured to measure QoE of network traffic.

Figure 2A:
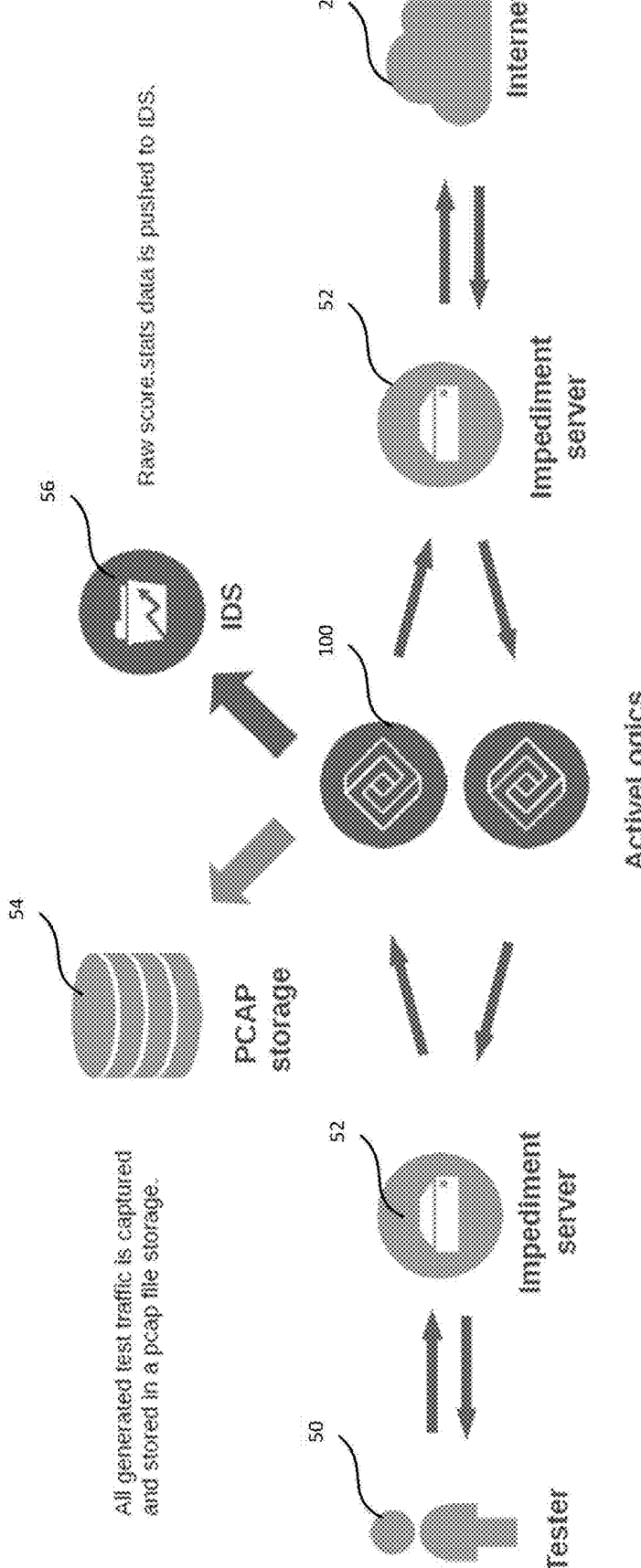
FIGS. 2A to 2C illustrates diagrams of lab use to collect data and end user provided MOS.
Figure 2B:
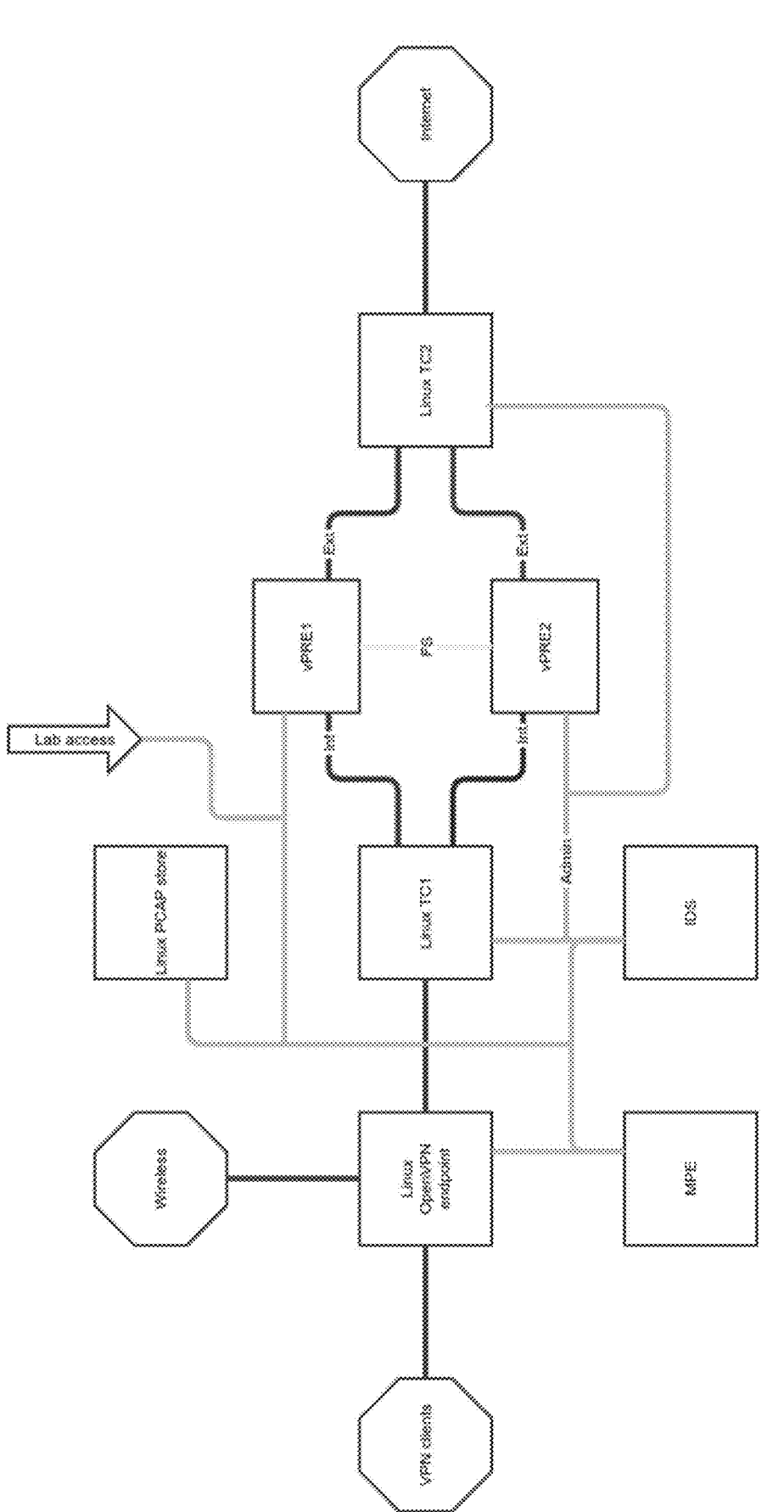
Figure 2C:
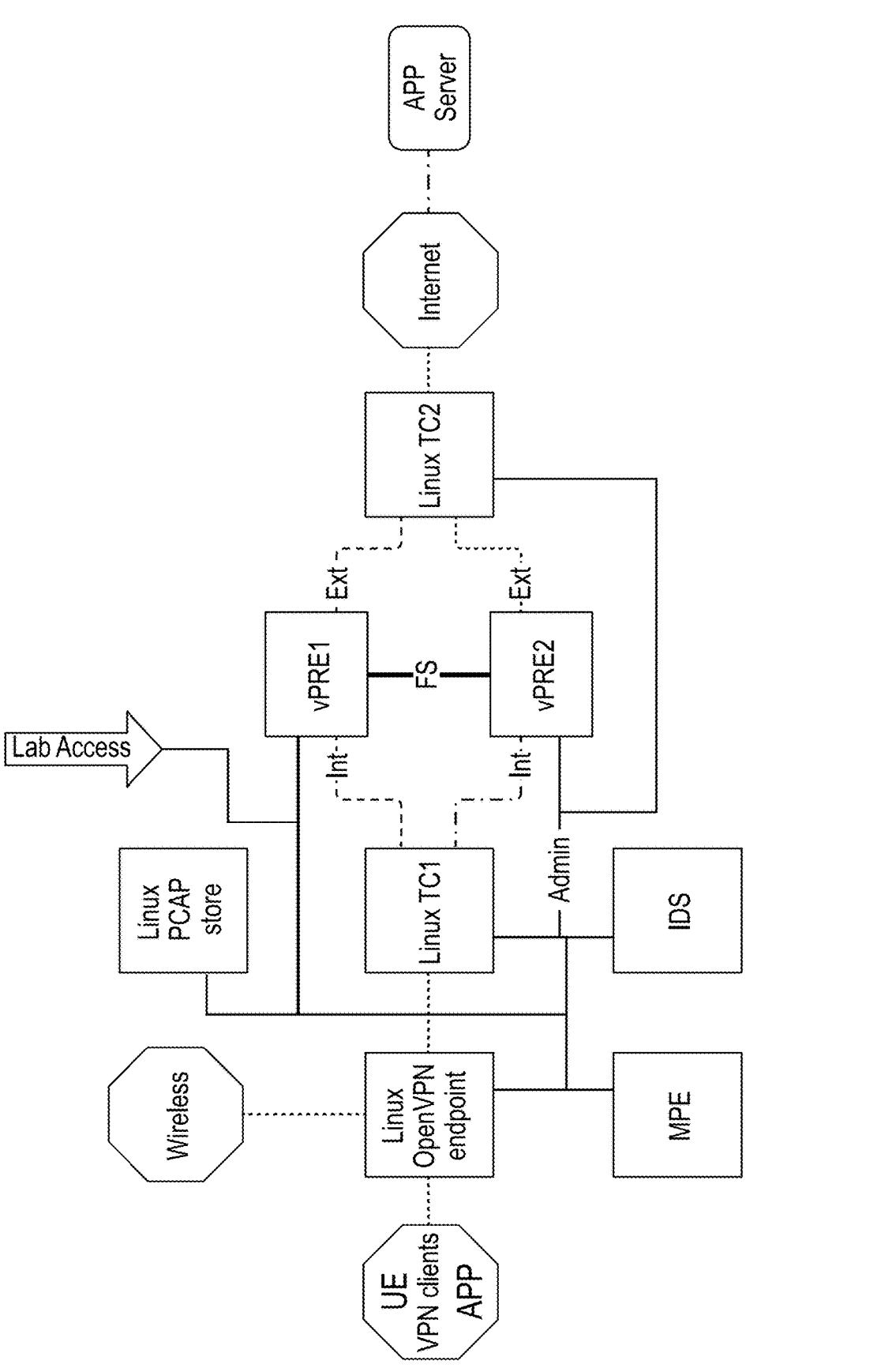

FIGS. 2A to 2C illustrate a Device Lab set up configured to collect data and provide End User MOS. It will be understood that a lab setting generally has infrastructure for user traffic passing through to the Internet, to introduce impediments, to store raw score statistics, to store packet captures (pcaps) and various like tasks.

FIG. 2A illustrates a tester 50 interacting with at least one server 52 for determining end user MOS. The server interacts with active logic units of the system 100 such that all the test traffic is captured and stored in a memory component 54. The system also pushes data to an internal data system (IDS) 56. The traffic for the tester continues to other servers 52 and the Internet 20, where responses are received, and the flow continues in reverse.

The at least one server 52 is intended to introduce issues that cause degradation of end user QoE, such as Latency, Packet loss, Bandwidth limitations, and the like. In some cases, two or more active logic units may be deployed with the option of using asymmetric traffic when generating test data.

In FIG. 2C, the Application and Application Server are also shown. In a specific example, a subscriber may access Netflix, the application (App) is Netflix running on a user's device for example a mobile device, and the Application Server would be the Netflix server with which the App will interact. In order to be able to test real applications, it is not typically possible to get proprietary application servers in a lab environment. Typically, content providers like Netflix are not going to provide its server for testing. Further, it is logical to collect data using actual end to end servers imitating real world experience. This is intended to allow the lab infrastructure to control the data transfer conditions so that the test can be carried out by emulating various network conditions.

The lab environment used by the system and shown in FIGS. 2B and 2C provides for the end user device (for example, Mobile, Laptop, Tablet, TV, or the like) to connect to a controlled VPN endpoint by configuring the credentials onto the end user device. Therefore, all the data transfer will happen via the VPN server. This VPN Server (for example, OpenVPN Endpoint) is further connected to a network device having a logic module in the path of the traffic flow. This network device is intended to connect to Linux machines on both sides (TC1 and TC2) that can be used for introducing impediments. The impediments could be rate limiting, packet drops, increased RTT, or the like. In both the directions, the packet drops may be introduced after the logic module has seen the packet or before or both to account for different scenarios. The impediments may be introduced at random or at preconfigured time intervals.

The end user is asked to provide a Score between 1 to 5 for the duration of the data transfer. The end user is asked to provide at least one score and in some cases, may be instructed to provide an updated or further score if his perception of score changes. During the whole period of test, various statistics such as throughput, loss, jitter, and the like are collected. Packet captures with timestamps are also collected for offline analysis in the logic module and in the End User's device.

The test is intended to be first run as a reference sample under good conditions with no impediments to establish a reference QoE. These reference conditions are used to establish what constitutes a 5. Some users may give a score of 4 even for reference conditions, and since there is no possibility of such a user rating it as 5, the scores are normalized to a scale of 1 to 5. So a user rating a 4 under reference condition where network should be considered to be good will be scaled up to 5. Further, this user's ratings are intended to all be scaled proportionally: AdjustedUserRating=UserRating*5/4 in such a case.

Similarly, the test may be run under very bad conditions and an End User's rating recorded. If the value is not 1, then the lower range is assumed to be the value the user provided. Many users rate even very bad experience as 2, and therefore the range needs to be normalized. AdjustedUserRating=UserRating*5/(5−(2−1)). Note that 1 is the minimum value and not zero.

The final formula then becomes:

$$AdjustUserRating=UserRating*5/(UserRatingUnderGoodCondition-UserRatingUnderBadCondition-1)$$

Alternatively, users are provided description of different ratings and the values are mapped without letting the user know to what the values generally correspond. In a particular example for Netflix, the descriptions may be:

1. Did not get good experience most of the time;
2. Did not work well many times;
3. Worked fine, but the video quality was low or the video was not interactive enough;
4. Worked fine, had an occasional issue; or
5. Worked fine.

By giving the above text, the user knows how the system expects Netflix to be rated.

Figure 3:
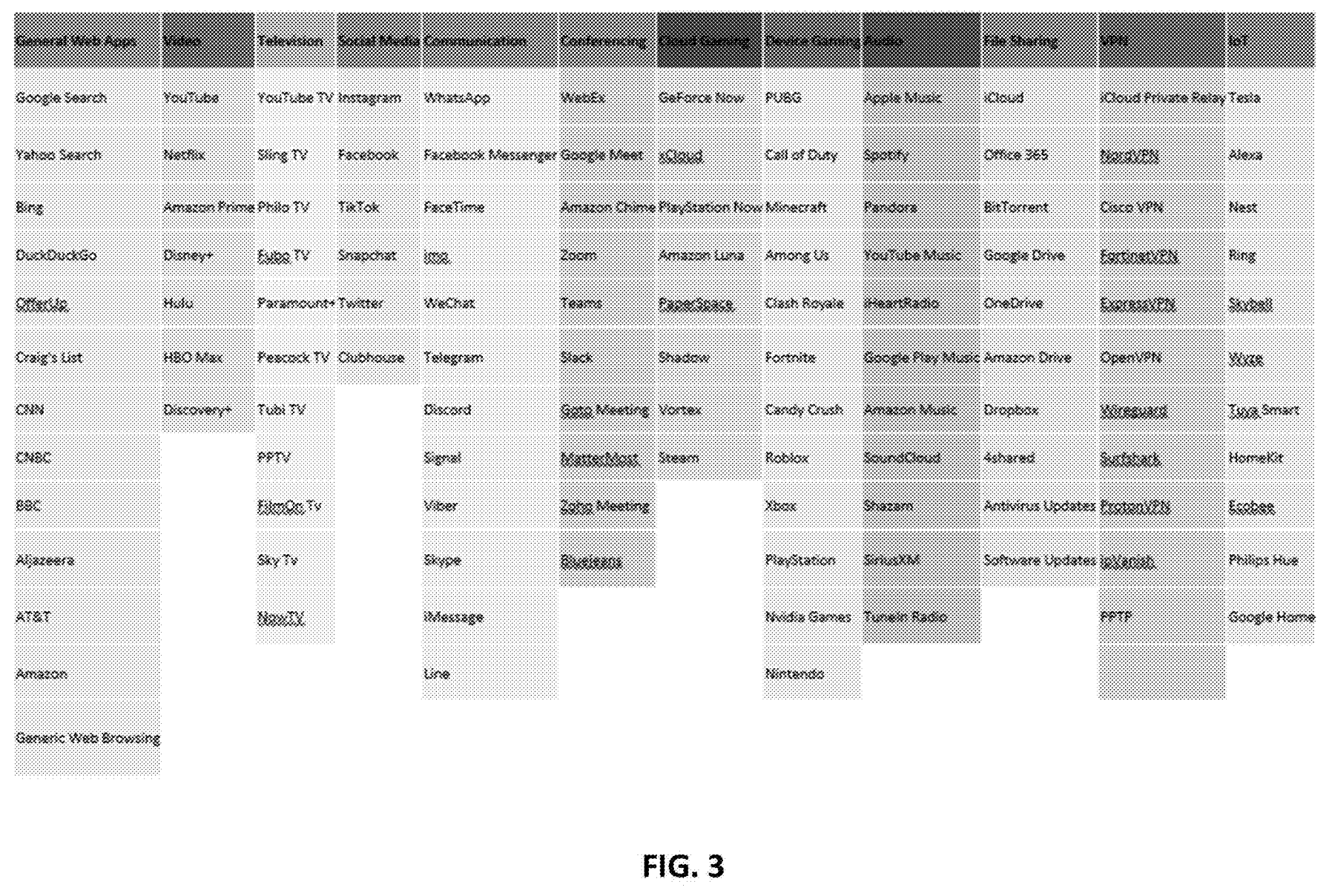
Figure 4:
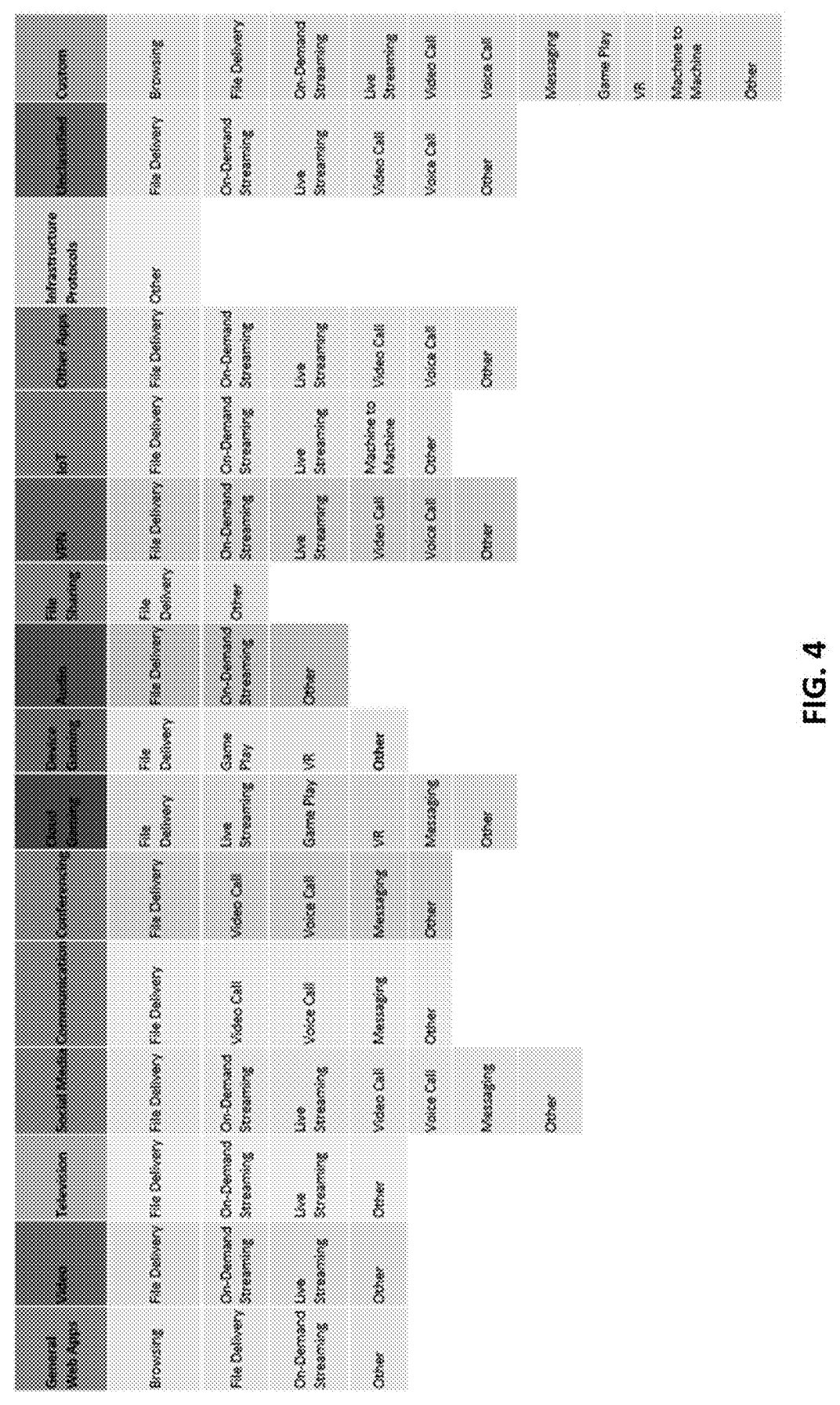

In some cases, the tests are run by using crowd sourcing (have many different users run the tests) for each application. An example of various applications per application category is shown in FIG. 3. The content categories generated by, for example, a logic module or a content module, is also collected as QoE is taken per content category. An example of various application per content category is shown in FIG. 4.

Figures 5, 6:
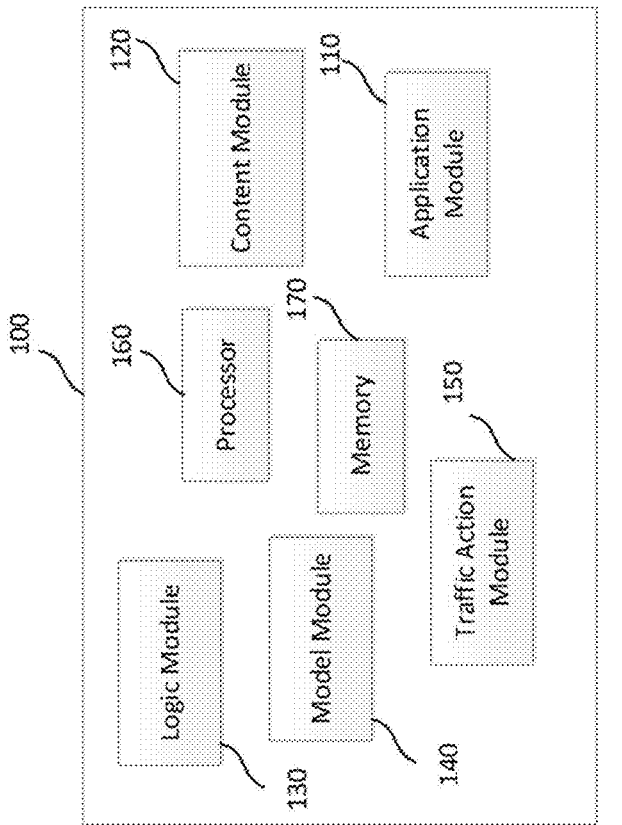
FIG. 5 illustrates a system for determining MOS for application QoE according to an embodiment.
FIG. 6 is a flow chart of a method for determining MOS for application QoE according to an embodiment.

FIG. 5 illustrates an embodiment of a system for determining MOS for Application QoE. The system is intended to include an application module 110, a content module 120 a logic module 130 a model module 140, a traffic action module 150, at least one processor 160 and at least one memory component 170. The system is generally intended to be distributed and reside in the data plane. The system may be further connected to a lab setting for initiation and for model construction. A central processing unit or at least one control processor may be configured to execute the instructions stored in the memory component in order for the modules to execute their functions. The memory component may be associated with or may included the memory component 54.

The application module 110 is configured to identify the application of a traffic flow using application recognition. Further the content module 120 is configured to determine the content category associated with the traffic flow using content recognition.

The logic module 130, sometimes referred to as the active logic module, is configured to review and determine impediments or traffic conditions affecting the QoE and the users' results associated with these traffic conditions. The logic module 130 may be configured to normalize raw data scores and may be configured to perform other tasks as detailed herein.

The model module 140 is configured to train and update a machine learning model for determining MOS for Application QoE as detailed herein.

A traffic action module 150 is configured to determine whether there are any policies that may be applied if it is determined that the QoE is below a predetermined interval.

FIG. 6 illustrates a method 200 for determining MOS for application QoE, and in particular illustrates how the collected data from the lab training is used to train a model.

As output from this method, the model is configured to determine a set of thresholds for each application for a number of variables (for example, Throughput, Latency, Loss, Latency, and the like) during specified time-periods of usage, mapping these variables to a distinct score of 1 through 5.

As an example, a user is watching Netflix on his device, and the time-series data for Throughput could be (45 Mbps, 45 Mbps, 1 Mbps, 0 Mbps, 0 Mbps, 5 Mbps, 45 Mbps, 45 Mbps), and RTT (30 ms, 35 ms, 35 ms, 18 ms, 12 ms, 12 ms, 18 ms, 35 ms, 35 ms), and Loss (0.5%, 1%, 1%, 0.5%, 0.3%, 0.5%, 0.7%, 0.5%).

The user subjectively scores this experience as 4 out of 5. As an example, threshold that would have served well for this single user would be:

Throughput during 5 or more of 8 samples >50 Mbps means a score of 5

Throughput during 3 or more of 8 samples >30 Mbps means a score of 4

Throughput during 2 or more of 8 samples <20 Mbps means a score of 3

Similar thresholds for RTT, Loss and Jitter may be determined in a similar manner. Embodiment so the system and method provide for logical rules for how to combine the metrics in a decision tree, or another manner using machine learning. In will be understood that a variety of machine learning models may be used.

As shown in FIG. 6, the system, via the logic module collects input data that has been received and stored in the lab setting, at 210. The Logic module or active logic module is configured to extract a feature set as noted herein, at 220. The Model module uses the feature set to train the model using reinforcement learning and/or supervised learning, at 230. The model module may now provide the model as an output to determine MOS on a live computer network, at 240.

In some cases, an application level buffering factor can also used. At the instance when user sees QoE as bad in Netflix, it is likely that the issue started earlier and has taken a period of time prior to being noticed by the user. This will give a period of time for which the data transfer may not have been good, but video might have continued to play at a reasonable level due to buffering. For this purpose, calculating and collecting a network QoE is also useful. The network QoE may have had a reduction prior to the user noticing bad QoE.

The processing is done by collecting the above parameters over a window along with timestamps. For example, for Netflix, the statistics can be collected in, for example, 1 second 5 seconds, 10 seconds or the like intervals. This is used to correlate the statistics with the timestamps for which that user has provided QoE. When using reinforcement learning, this allows to provide a credit or debit based on QoE score increase/decrease.

Embodiments of the system and method detailed herein are intended to provide for improved understanding of Key Performance Indicators and their relations with Application Content categories. Further, the system and method are intended to collect labelled data to use for training machine learning models and AppQoE bin definitions and methods. By collecting Pcaps, the system and method are able to provide a detailed analysis of the network traffic, classification of the network traffic and may use the Pcaps to evaluate new metrics to be added to the system in the future.

In building the model, the system and method are intended to aggregate the App QoE scores. The system may collect granular data, for example, App QoE scores may be published to a table along with a set of dimensions or parameters, for example, time, subscriber, application, application category, application content category, location, device, service plan and the like. The data is then intended to be aggregated by the system to determine a feature set. In some cases, the aggregation may be over time, for example a 5 minute aggregation, hourly aggregation, daily aggregation or the like. In other cases, the aggregation may be over a reduced dimension set, where like dimensions are aggregated into a more general dimension set.

Various methods may be used when aggregating the collected data. In one example a weighted average may be used, such as:

$$\text{weighted average} = \frac{\sum_{n=1}^{N} \text{score}_n \cdot \text{weight}_n}{\sum_{n=1}^{N} \text{weight}_n}$$

Where N is the number of records to aggregate, $\text{score}_n$ is the score of the n'th record and $\text{weight}_n$ is the weight of the n'th record.

In some cases, the App QoE score may be calculated prior to being stored in or exported to the Internal Data system. Each record that can be scored may have the score populated in the associated record. In order to aggregate scores from multiple records into a single representation, each App QoE score may be assigned a weight factor that is used when aggregating the App QoE scores. The weight factor will be set per record and by based on, for example the activity and/or duration of the record, the application category, the content category and the like. In some cases, the weights associated with the record holding each calculated score would be in the range 0-1, but as multiple records are aggregated the weight of the aggregated records could exceed that range. It will be understood that other ranges could be used.

In an example, a greater weight will be assigned for a longer duration. It has been determined the longer the duration of the experience, the more it contributes to the aggregated App QoE score. In a specific example: Subscriber X has been watching both Netflix and YouTube within the same 5 minute interval. The Netflix session lasted for 4 minutes and the YouTube session only for 1 minute. There would be two records for subscriber X in IDS. One for the Netflix traffic and one for the YouTube traffic. Let's now assume that the Netflix experience was scored as '5' (A) and the YouTube experience was scored as '1' (E). Since each record also has a weight that is relative to the duration/ activity of the session this would look something like this table:

| Subscriber | Application | Application Content Category | App QoE score | App QoE score weight |
|---|---|---|---|---|
| Subscriber X | Netflix | On-demand streaming | 5 | 0.8 |
| Subscriber X | YouTube | On-demand streaming | 1 | 0.2 |

The weight may also be determined by the application and content category. Different application categories and application content categories could also be weighted differently. The system is configured to determine that an application which is mostly running in the background should have lower weight than something which is running in the foreground and thereby being more visible to the subscriber. In a specific example, if a subscriber is watching an on demand video while downloading software updates for his/her operating system, the on demand video experience is likely to have a larger impact on the overall subscriber experience than the software download It is intended that the weight factor populated by the system will be based on activity/duration of the record. The weight factor however is subject to change and could be updated in the future. Therefore, the IDS logic for populating weights into the rollup tables is intended to be simple and consider the weight as weight. It is intended that the IDS does not know the underlying factors that contributed to the weight. In some cases, the system provides a populated weight column for a record in a rollup table with the sum of weights of the records that were aggregated into that record. In some cases, the range of the weight values may be different in the different rollup tables and the weights will become larger and larger per records the more they are rolled up. Examples of the rollup tables are provided below, where the hourly rollup table has larger rates that the table updated more frequently.

| appqoe.stats | | | | appqoe.stats_hourly | | | |
|---|---|---|---|---|---|---|---|
| ts | app | weight | score | ts | app | weight | score |
| 12:00 | Netflix | 0.5 | 4 | 12:00 | Netflix | 1.7 | 4.18 |
| 12:15 | Netflix | 0.3 | 5 | 13:00 | Netflix | 2.6 | 4.54 |
| 12:35 | Netflix | 0.2 | 4 | | | | |
| 12:55 | Netflix | 0.7 | 4 | | | | |
| 13:00 | Netflix | 0.5 | 4 | | | | |
| 13:05 | Netflix | 0.7 | 5 | | | | |
| 13:10 | Netflix | 0.2 | 5 | | | | |
| 13:15 | Netflix | 0.3 | 5 | | | | |
| 13:35 | Netflix | 0.2 | 5 | | | | |
| 13:55 | Netflix | 0.7 | 4 | | | | |

Figure 7:
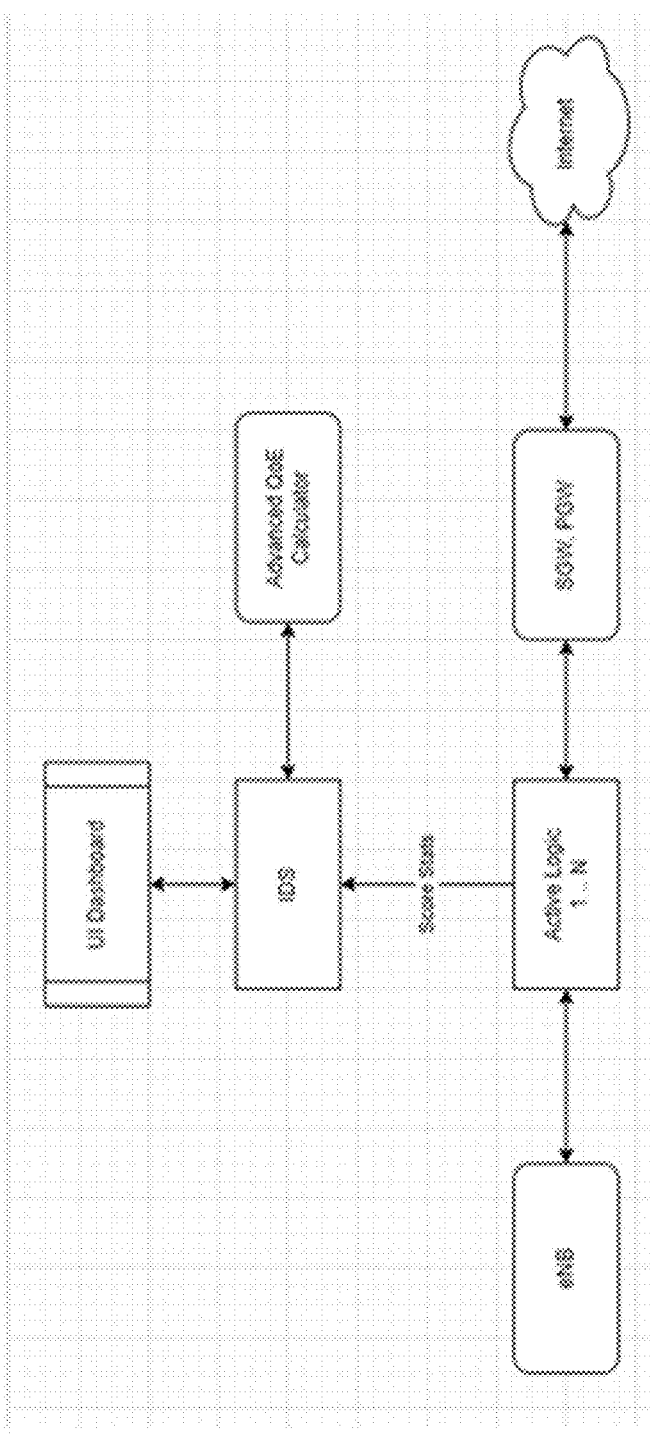
FIG. 7 is a diagram illustrating the flow through the network to determine QoE.

FIG. 7 illustrates a deployment of the system and the flow of information. The system, via for example, application recognition or an active logic module is configured to provide for application classification and content category classification. The system may also provide the relevant statistics to an internal data system that would be useful for calculating QoE. Advanced QoE methods may run periodically or on every report depending on configuration. The system is further configured to determine the QoE per content category periodically or on every report depending on configuration of the system. The system is configured to determine QoE as provided herein.

Figure 8:
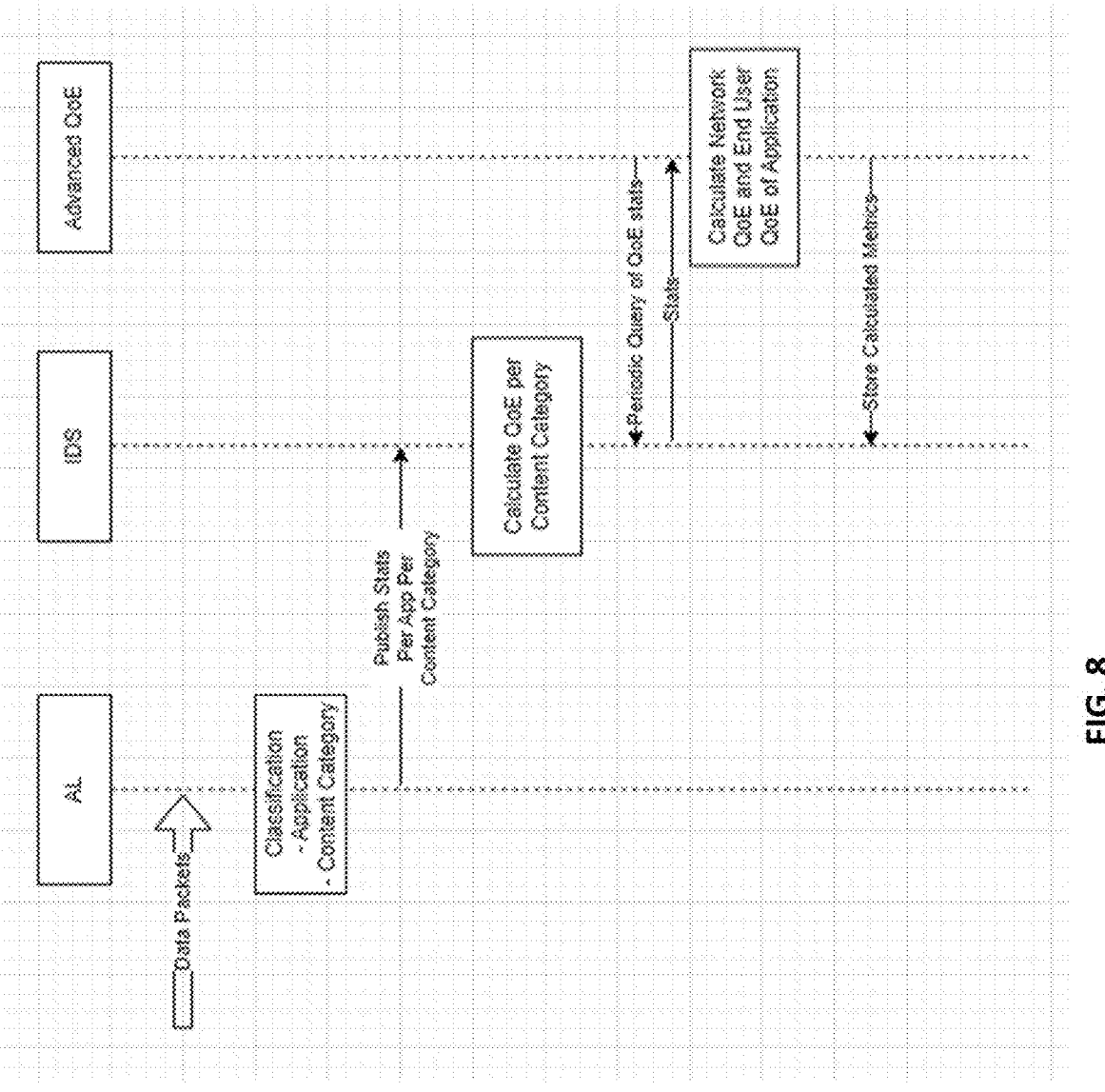
FIG. 8 is a sequence chart illustrating a method for determining application QoE using MOS, according to an embodiment.

A high-level sequence chart of a specific example is shown in FIG. 8. Data packets are continuously processed in the system using Active Logic (AL). On detecting a new flow, the application module identifies the application contained in the traffic flow. For the duration of the flow, the content categories are recognized, via the content module. Relevant statistics for the application and content categories are published to an internal data system associated with the content module. The system periodically calculates QoE per Content Category and per Application. Periodically, the system determines the End user QoE of the application. If the score is below a desired level, a root cause analysis may be initiated to determine whether there is problem in the network, and if so what the problem and solution may be. The root causes analysis will be aided by the collected network KPIs which may be published with the determined score.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A system for determining application quality of experience, the system comprising at least one processor configured to execute instructions stored in a memory component wherein the instructions provide for:

a logic module configured to collect input data, previously stored in a lab setting, and associated with network traffic flow parameters, wherein at least one network traffic flow parameter comprises determining a duration of use of an application and determining a weight of the network traffic flow parameter based on the duration of use by an end user, extract a feature set based on the network flow parameters associated with Application Quality of Experience scores; and aggregate the feature set over a predetermined time period, wherein the aggregation is a weighted average, wherein different application and different application content categories are weighted differently;

a model module configured to train a machine learning model to determine a mean opinion score (MOS) based on the aggregated feature set; and a traffic action module configured to monitor the MOS based on the machine learning model and the traffic flow in the network and determine an application quality of experience based on the MOS.

2. The system of claim 1 wherein the input data is aggregated over shorter periods of time records and the aggregated shorter period of time records are further aggregated over longer periods of time.

3. The system of claim 1 wherein the logic module is configured to aggregate the input data over a plurality of traffic flow parameters.

4. The system of claim 1 wherein the logic module is configured to aggregate the input data based on a weighting provided for each parameter.

5. The system of claim 1 wherein the logic module is configured to receive end user input as one network traffic flow parameter of the network flow parameters.

6. The system of claim 1 wherein the logic module comprises at least two logic modules configured to generate asymmetric traffic for the input data.

7. The system of claim 1 wherein the network traffic flow parameters comprise at least one of the group comprising: time, subscriber, application, application category, application content category, location, device, and service plan.

8. The system of claim 1 wherein the aggregation determines which applications are running in the background and assigns lower weighting to background applications.

9. A method for determining application quality of experience comprising:

collecting input data associated with network flow parameters, previously stored in a lab setting, wherein at least one network traffic flow parameter comprises determining a duration of use of an application and determining a weight of the network traffic flow parameter based on the duration of use by an end user;

extracting a feature set based on the collected data associated with Application Quality of Experience scores;

aggregating the feature set over a predetermined period of time, wherein the aggregating is a weighted average, wherein different application and different application content categories are weighted differently;

training a model to determine mean option score (MOS) of network traffic based on the extract feature set;

deploying the model to monitor the MOS of traffic flow in the computer network; and determining the quality of experience based on the MOS.

10. The method of claim 9 further comprising aggregating over shorter periods of time records and the aggregated shorter period of time records are further aggregated over longer periods of time.

11. The method of claim 9 further comprising aggregating the input data over a plurality of traffic flow parameters.

12. The method of claim 9 further comprising aggregating the input data based on a weighting provided for each parameter.

13. The method of claim 9 further comprising receiving end user input as one network traffic flow parameter of the network flow parameters.

14. The method of claim 10 wherein the parameters comprise at least one of the group comprising: time, subscriber, application, application category, application content category, location, device, and service plan.

15. The method of claim 9 further comprising generating asymmetric traffic to be collected as input data.

16. The method of claim 9 wherein the aggregation determines which applications are running in the background and assigns lower weighting to background applications.

* * * * *